(12) United States Patent
Mischler et al.

(10) Patent No.: US 9,157,352 B2
(45) Date of Patent: Oct. 13, 2015

(54) METHODS AND SYSTEMS FOR AN ENGINE

(75) Inventors: James Robert Mischler, Lawrence Park, PA (US); Roy Primus, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 674 days.

(21) Appl. No.: 13/430,215

(22) Filed: Mar. 26, 2012

(65) Prior Publication Data

US 2013/0247562 A1 Sep. 26, 2013

(51) Int. Cl.
| | |
|---|---|
| F02B 33/44 | (2006.01) |
| F02B 33/00 | (2006.01) |
| F01N 5/04 | (2006.01) |
| F01N 3/00 | (2006.01) |
| F01N 3/023 | (2006.01) |
| F01N 9/00 | (2006.01) |
| F02B 37/18 | (2006.01) |
| F02B 37/24 | (2006.01) |
| F02B 39/12 | (2006.01) |

(52) U.S. Cl.
CPC ............ *F01N 3/0236* (2013.01); *F01N 9/002* (2013.01); *F02B 37/18* (2013.01); *F02B 37/24* (2013.01); *F02B 39/12* (2013.01); *F01N 2590/08* (2013.01); *Y02T 10/144* (2013.01); *Y02T 10/47* (2013.01)

(58) Field of Classification Search
CPC .......... F02B 37/18; F02B 37/24; F02B 39/12; F02B 37/00; F01N 3/0236; F01N 9/00; F01N 2410/00; F01N 2410/04; F01N 2590/08; F02D 23/005; F05B 2220/40
USPC ................ 60/602, 605.1, 609, 280, 295; 123/559.1, 559.3
See application file for complete search history.

(56) References Cited

U.S. PATENT DOCUMENTS

| 4,698,761 A | 10/1987 | Cooper |
| 5,425,338 A | 6/1995 | Gottemoller |

(Continued)

FOREIGN PATENT DOCUMENTS

| DE | 102006008228 A1 | 8/2007 |
| DE | 102007052117 A1 | 5/2009 |

(Continued)

OTHER PUBLICATIONS

A Fully Certified English Translation of Minoru Arai (Pub. No. 63-134810 A), published on Jun. 7, 1988.*

(Continued)

*Primary Examiner* — Thai Ba Trieu
(74) *Attorney, Agent, or Firm* — GE Global Patent Operation; John A. Kramer

(57) ABSTRACT

Various methods and systems are provided for an engine system for a vehicle. In one example, the engine system includes a turbocharger including a turbine, the turbocharger configured to be driven via exhaust gas from an engine during a turbocharger mode and via the exhaust gas from the engine and mechanical output from the engine during a supercharger mode. The engine system further includes a bypass control element to decrease an amount of energy extracted from exhaust flow through the turbine in a regeneration mode of operation and to increase an amount of energy extracted from exhaust flow through the turbine during a non-regeneration mode of operation, and an aftertreatment system disposed downstream of the turbocharger and including a particulate filter.

20 Claims, 7 Drawing Sheets

(56) References Cited

U.S. PATENT DOCUMENTS

| | | | |
|---|---|---|---|
| 5,561,602 A | 10/1996 | Bessler | |
| 6,732,522 B2 * | 5/2004 | Wright et al. | 60/602 |
| 6,799,096 B1 | 9/2004 | Franke | |
| 6,851,256 B2 * | 2/2005 | Chamoto et al. | 60/602 |
| 6,880,524 B2 | 4/2005 | Gates | |
| 7,021,220 B2 | 4/2006 | Harada | |
| 7,072,747 B2 | 7/2006 | Armbruster | |
| 7,198,038 B2 | 4/2007 | McLain | |
| 7,314,041 B2 | 1/2008 | Ogawa | |
| 7,735,320 B2 * | 6/2010 | Yanakiev | 60/602 |
| 7,765,805 B2 * | 8/2010 | Lofgren | 60/608 |
| 8,490,387 B2 * | 7/2013 | Schreiber et al. | 60/284 |
| 8,522,550 B2 * | 9/2013 | Lofgren | 60/608 |
| 2005/0188682 A1 * | 9/2005 | Fledersbacher et al. | 60/284 |
| 2008/0053088 A1 * | 3/2008 | Yanakiev | 60/602 |
| 2008/0282698 A1 * | 11/2008 | Ferrari et al. | 60/602 |
| 2009/0044530 A1 * | 2/2009 | Gallagher et al. | 60/605.1 |
| 2009/0188252 A1 | 7/2009 | Kolitsch et al. | |
| 2010/0180584 A1 | 7/2010 | Berger et al. | |
| 2010/0199956 A1 * | 8/2010 | Lofgren | 60/607 |
| 2011/0146274 A1 * | 6/2011 | Shimizu et al. | 60/611 |
| 2011/0289914 A1 * | 12/2011 | Afjeh | 60/602 |
| 2013/0090832 A1 * | 4/2013 | Bevan et al. | 701/102 |

FOREIGN PATENT DOCUMENTS

| | | | | |
|---|---|---|---|---|
| EP | 2309102 A1 | | 4/2011 | |
| FR | 2906310 A1 | | 3/2008 | |
| JP | 63109235 A | * | 5/1988 | F02B 37/10 |
| JP | 63134810 A | | 6/1988 | |
| JP | 07117669 A | | 5/1995 | |
| JP | 10329717 A | | 12/1998 | |
| JP | 2003129825 A | * | 5/2003 | F01N 3/02 |
| JP | 2006348761 A | * | 12/2006 | F02B 37/18 |

OTHER PUBLICATIONS

A fully Certified English Translation of Hiroshi Funahashi et al. (Pub. No. JP 2003129825 A), published on May 8, 2003.*
U.S. Appl. No. 13/186,595, filed Jul. 20, 2011, Title: System and Method for Regenerating a Particulate Filter; Inventors: Shawn Gallagher, et al.
U.S. Appl. No. 13/186,641, filed Jul. 20, 2011, Title: Method and System for Controlling an Engine During Tunneling Operation; Inventors: Luke Henry, et al.
U.S. Appl. No. 12/816,063, filed Jun. 15, 2010, Title: Method and System for Controlling Engine Performance; Inventors: Kendall Swenson, et al.
Search Report and Written Opinion from corresponding PCT Application No. PCT/US2013/028128 dated Jun. 12, 2013.

* cited by examiner

METHODS AND SYSTEMS FOR AN ENGINE

FIELD

Embodiments of the subject matter disclosed herein relate to systems and methods for an engine with a turbocharger and an exhaust gas treatment device.

BACKGROUND

During operation, internal combustion engines generate various combustion by-products that are emitted from the engine in an exhaust stream. As such, various approaches may be utilized in order to reduce regulated emissions. In some examples, particulate emissions may be reduced by employing an aftertreatment system with a device such as a particulate filter in an exhaust passage of the engine. Further, turbochargers may be used in an engine system to increase a pressure of air supplied to the engine for combustion. In one example, the turbocharger includes a turbine coupled in an exhaust passage of the engine which at least partially drives a compressor via a shaft to increase the intake air pressure.

Over time, a particulate load of the particulate filter may increase such that regeneration of the particulate filter needs to be carried out to clean the particulate filter so that a back-pressure on the engine does not increase, for example. The inventors herein have recognized when the particulate filter is positioned downstream of the turbine of the turbocharger in the exhaust passage, an exhaust gas temperature upstream of the particulate filter and downstream of the turbine may not be high enough to passively regenerate the particulate filter. Thus, active regeneration may be carried out by injecting fuel upstream of the particulate filter or heating the particulate filter via a heater, for example. In such an approach, efficiency of the system may be reduced due to increased fuel consumption and/or a cost of the system may be increased due to addition of components such as the heater.

BRIEF DESCRIPTION

Thus, in one embodiment, an engine system for a vehicle includes a turbocharger which includes a turbine. The turbocharger is configured to be driven via exhaust gas from an engine during a turbocharger mode and via the exhaust gas from the engine and mechanical output from the engine during a supercharger mode. The engine system further includes a bypass control element operable to decrease an amount of energy extracted by exhaust flow through the turbine in a regeneration mode of operation and to increase an amount of energy extracted by exhaust flow through the turbine during a non-regeneration mode of operation, and an aftertreatment system disposed downstream of the turbocharger and including a particulate filter. The amount of energy that is extracted is decreased, for example, by routing exhaust gas around the turbine and through a bypass. Likewise, the amount of energy that is extracted is increased by routing exhaust gas through the turbine. Alternatively, where the turbine is a variable geometry turbine, the amount of energy that is extracted can be varied by adjusting an aspect ratio of the turbine.

By extracting less energy from exhaust flow through the turbine (for example, by bypassing the turbine) under conditions in which regeneration of the particulate filter is desired, an exhaust gas temperature downstream of the turbocharger and upstream of the particulate filter may be increased such that regeneration of the particulate filter may be carried out. Further, because the turbocharger may be driven by mechanical output from the engine during the regeneration mode of operation, boost provided to the engine from the turbocharger may be maintained during regeneration of the particulate filter, thereby maintaining an efficiency of the system.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
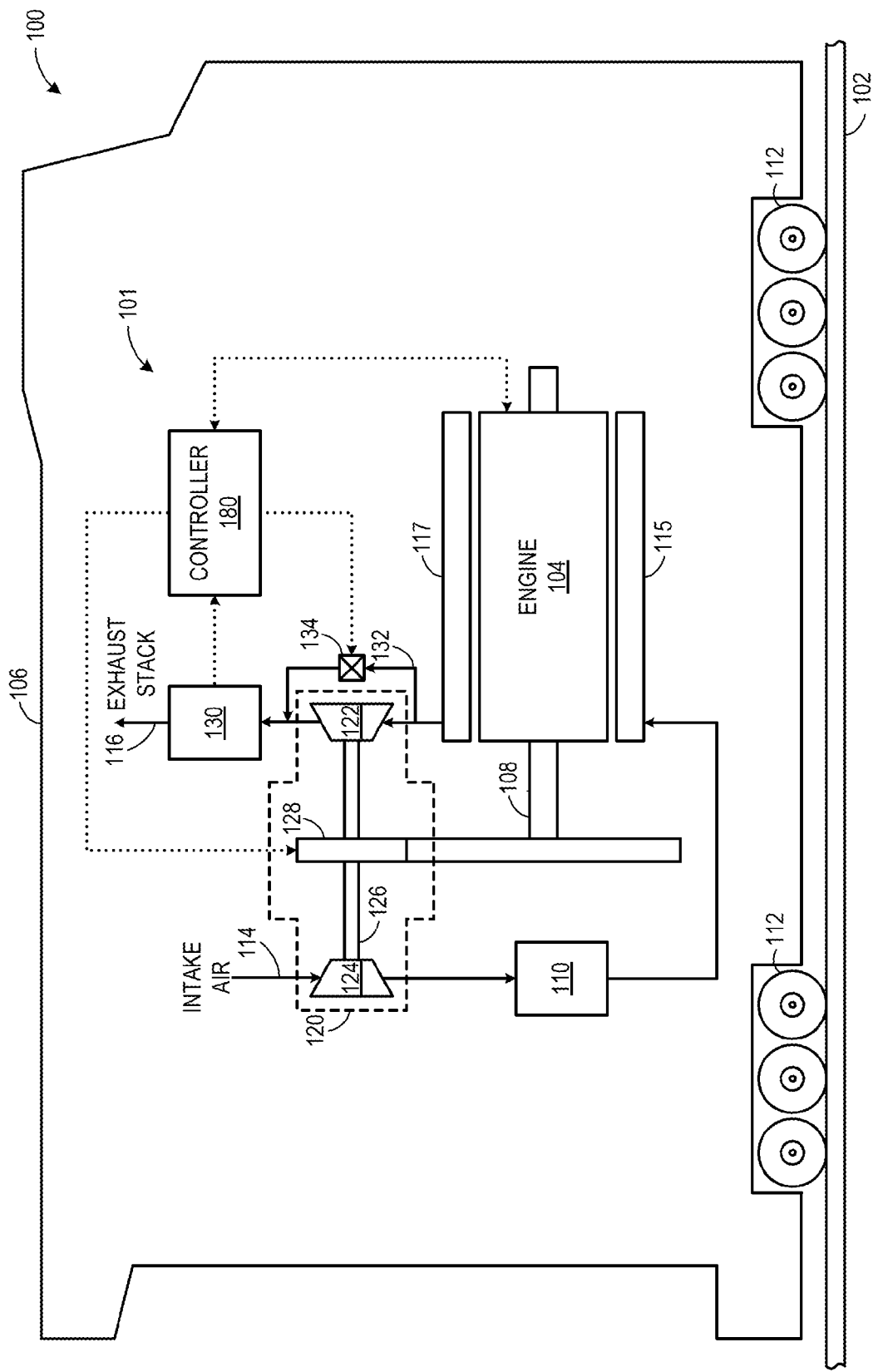
FIG. 1 shows a schematic diagram of an engine system including a turbocharger with a bypass, where the engine system is positioned in a rail vehicle.

The following description relates to various embodiments of methods and systems for an engine system which includes a turbocharger and an aftertreatment system. In one example embodiment, an engine system comprises a turbocharger including a turbine, the turbocharger configured to be driven via exhaust gas from an engine during a turbocharger mode and via the exhaust gas from the engine and mechanical output from the engine during a supercharger mode. The engine system further comprises a bypass control element disposed in a bypass around the turbine of the turbocharger and operable to route exhaust gas around the turbine in a regeneration mode of operation and to route the exhaust gas through the turbine during a non-regeneration mode of operation, and an aftertreatment system disposed downstream of the turbocharger and including a particulate filter. In such an embodiment, the exhaust gas may be directed around the turbine, rather than through the turbine, during the regeneration mode of operation such that a temperature of the particulate filter may be increased by the exhaust gas and passive regeneration of the particulate filter may be carried out. Since the energy provided to the turbocharger from the exhaust gas is decreased during the regeneration mode, the turbocharger may be driven by mechanical output from the engine such that boost may be maintained, for example.

In another example embodiment, the turbocharger of the engine system includes a variable geometry turbine. The engine system further comprises a bypass control element operable to adjust an aspect ratio of the variable geometry turbine to thereby adjust the amount of energy extracted from exhaust flow through the turbine. In particular, the bypass control element is actuated to increase the aspect ratio of the turbine during a regeneration mode of operation and to decrease the aspect ratio of the turbine during a non-regeneration mode of operation. In such an embodiment, less energy is extracted from exhaust gas flowing through the turbine during the regeneration mode of operation such that a temperature of exhaust gas passing through the particulate filter is increased by passage of the exhaust gas and passive regeneration of the particulate filter may be carried out. Since the energy provided to the turbocharger from the exhaust flow is decreased during the regeneration mode, the turbocharger may be driven by mechanical output from the engine such that boost may be maintained, for example.

In one embodiment, the turbocharger may be coupled to an engine in a vehicle. A locomotive system is used to exemplify one of the types of vehicles having engines to which the turbocharger may be attached. Other types of vehicles may include on-highway vehicles and off-highway vehicles other than locomotives or other rail vehicles, such as mining equipment and marine vessels. Other embodiments of the invention may be used for turbochargers that are coupled to stationary engines. The engine may be a diesel engine, or may combust another fuel or combination of fuels. Such alternative fuels may include gasoline, kerosene, biodiesel, natural gas, and ethanol. Suitable engines may use compression ignition and/or spark ignition.

FIG. 1 shows a block diagram of an exemplary embodiment of a vehicle system 100, herein depicted as a locomotive or other rail vehicle 106 configured to run on a rail 102 via a plurality of wheels 112. As depicted, the rail vehicle 106 includes an engine system 101 with an engine 104, such as an internal combustion engine. In some embodiments, the engine 104 may be a two-stroke engine which completes a combustion cycle over one revolution (e.g., 360 degree rotation) of a crankshaft 108. In other embodiments, the engine 104 may be a four-stroke engine which completes the combustion cycle over two revolutions (e.g., 720 degree rotation) of the crankshaft 108. Further, in some examples, the engine 104 may be a V-12 engine having twelve cylinders. In other examples, the engine may be a V-6, V-8, V-10, V-16, I-4, I-6, I-8, opposed 4, or another engine type.

The engine 104 receives intake air for combustion from an intake, such as an intake manifold 115. The intake may be any suitable conduit or conduits through which gases flow to enter the engine. For example, the intake may include the intake manifold 115, an intake passage 114, and the like. The intake passage 114 receives ambient air from an air filter (not shown) that filters air from outside of the rail vehicle 106. Exhaust gas resulting from combustion in the engine 104 is supplied to an exhaust, such as exhaust passage 116. The exhaust may be any suitable conduit through which gases flow from the engine. For example, the exhaust may include an exhaust manifold 117, the exhaust passage 116, and the like. Exhaust gas flows through the exhaust passage 116, and out of an exhaust stack of the rail vehicle 106.

In the example embodiment shown in FIG. 1, intake air flows through a heat exchanger such as intercooler 110 to reduce a temperature of (e.g., cool) the intake air before it enters the engine 104 for combustion. The intercooler 110 may be an air-to-air or air-to liquid heat exchanger, for example.

As depicted in FIG. 1, the vehicle system 100 further includes a turbocharger 120 arranged between the intake passage 114 and the exhaust passage 116. The turbocharger 120 increases air charge of ambient air drawn into the intake passage 114 in order to provide greater charge density during combustion to increase power output and/or engine-operating efficiency. As depicted, the turbocharger 120 includes a turbine 122 which drives a compressor 124 via a shaft 126 which mechanically couples the turbine 122 and the compressor 124.

In the example embodiment shown in FIG. 1, the vehicle system 100 further includes a clutch mechanism 128 (or other type of selective mechanical coupling mechanism) which mechanically couples the turbocharger 120 to the crankshaft 108 of the engine 104. For example, the clutch mechanism 128 may be operated such that the turbocharger operates in two different modes: a turbocharger mode and a supercharger mode. In the turbocharger mode, the clutch mechanism 128 is disengaged so that the crankshaft 108 is not mechanically coupled to the shaft 126 of the turbocharger 120. As such, the turbocharger 120 is driven via the exhaust gas from the engine 104. For example, as the exhaust gas passes through the turbine 122, the turbine 122 spins and drives the compressor 124 via the shaft. In the supercharger mode, the clutch mechanism 128 is engaged so that the crankshaft 108 is mechanically coupled to the shaft 126 of the turbocharger 120. As such, the turbocharger 120 is driven by mechanical output from the engine 104 in addition to exhaust gas from the engine. For example, as the crankshaft 108 spins, the turbocharger shaft 126 is turned to drive to the compressor 124. Further, in the supercharger mode, any exhaust gas which flows through the turbine 122 may continue to spin the turbine 122 and drive the shaft 126.

The vehicle system 100 further includes a bypass 132 with a bypass control element 134, such as a wastegate, that may be controlled to adjust the flow of exhaust gas around the turbine 122. By adjusting the flow of exhaust gas around (or through) the turbine, the amount of energy extracted from exhaust flow through the turbine may be varied. For example, the bypass control element 134 is operably coupled with the bypass 132 such that a position of the bypass control element 134 governs an extent to which the bypass 132 is open for passage of fluid such as exhaust gas. The bypass control element 134 may be opened, for example, to divert the exhaust gas flow away from the turbine 122. In this manner, the rotating speed of the compressor 124, and thus the boost provided by the turbocharger 120 to the engine 104 may be regulated. Consequently, the amount of energy extracted by the turbocharger from exhaust flow through the turbine is adjusted. The bypass control element 134 may be any element that can be controlled to selectively partially or completely block a passage. As an example, the bypass valve may be a gate valve, a butterfly valve, a globe valve, an adjustable flap, or the like.

In other embodiments, the engine cylinders may be divided into two sets, where exhaust gas from one set of cylinders always flows through the turbine and exhaust gas from the second set selectively flows through the turbine based on a position of a bypass control element.

In one example, the system is configured for the bypass control element 134 to be adjusted to decrease an amount of energy extracted by exhaust flow through the turbine by reducing exhaust gas flow through the turbine 122 during operation in which particulate filter regeneration is desired (e.g., by routing exhaust gas around the turbine 132, and through bypass 132). For example, in one embodiment, the system includes a control unit, which may include a controller 180 described below, that is configured to adjust the bypass control element 134 (e.g., by generating control signal(s) to which the valve is responsive) to reduce exhaust gas flow through the turbine 122, in response to an indication of a particulate load being greater than a threshold load. In this way, an exhaust gas temperature downstream of the turbine 122 and upstream of the aftertreatment system 130 may be increased such that the particulate filter may be regenerated. Such an example will be described in greater detail below with reference to FIG. 5.

In another example, the system is configured for the bypass control element 134 to be adjusted to increase an amount of energy extracted by exhaust flow through the turbine by increasing exhaust gas flow through the turbine 122 during operation in which particulate filter regeneration is not desired. For example, controller 180 is configured to adjust the bypass control element 134 (e.g., by generating control signal(s) to which the valve is responsive) to increase exhaust gas flow through the turbine 122 (and decrease flow around the turbine via the bypass), in response to an indication of a particulate load being lower than a threshold load. The amount of increase in exhaust gas flow through the turbine is then determined by the engine load requirement. Herein, an exhaust gas temperature downstream of the turbine 122 and upstream of the aftertreatment system 130 may not be increased, and the particulate filter may not be regenerated. Such an example will be described in greater detail below with reference to FIGS. 2-3.

It will be appreciated that the boost level (and therefore the system flow) may be maintained, the difference being where the energy comes from to drive the compressor (specifically, from either the engine crankshaft or via expansion of gas through the turbine).

The aftertreatment system 130 is coupled in the exhaust passage in order to reduce regulated emissions, for example. As depicted in FIG. 1, the aftertreatment system 130 is disposed downstream of the turbine 122 of the turbocharger 120. In other embodiments, an aftertreatment system may be additionally or alternatively be disposed upstream of the turbocharger 120. The aftertreatment system 130 may include one or more components. For example, the aftertreatment system 130 may include one or more of a particulate filter (PF), an oxidation catalyst, a selective catalytic reduction (SCR) catalyst, a three-way catalyst, a $NO_x$ trap, and/or various other emission control devices or combinations thereof.

The rail vehicle 106 further includes the control unit 180, which is provided and configured to control various components related to the vehicle system 100. In one example, the control unit 180 includes a computer control system. The control unit 180 further includes non-transitory, computer readable storage media (not shown) including code for enabling on-board monitoring and control of rail vehicle operation. The control unit 180, while overseeing control and management of the vehicle system 100, may be configured to receive signals from a variety of engine sensors, as further elaborated herein, in order to determine operating parameters and operating conditions, and correspondingly adjust various engine actuators to control operation of the rail vehicle 106. For example, the control unit 180 may receive signals from various engine sensors including, but not limited to, engine speed, engine load, boost pressure, ambient pressure, exhaust temperature, exhaust pressure, etc. Correspondingly, the control unit 180 may control the vehicle system 100 by sending commands to various components such as traction motors, alternator, cylinder valves, throttle, heat exchangers, wastegates or other valves or flow control elements, etc.

Figure 2:
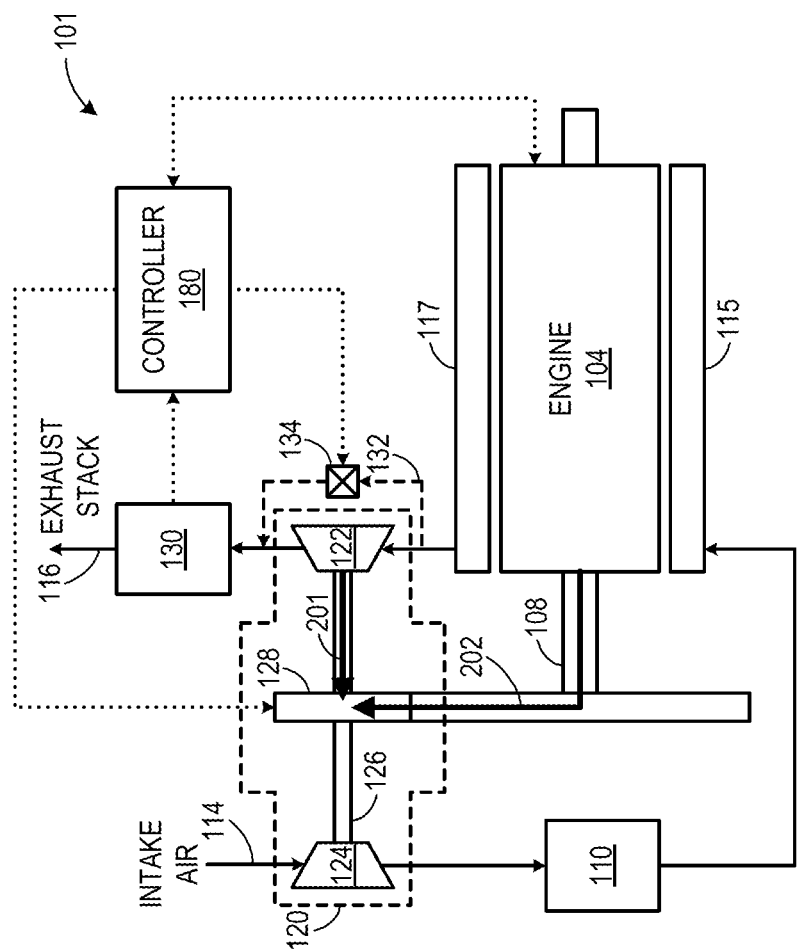
FIG. 2 shows a schematic diagram of the engine system of FIG. 1 in a non-regeneration mode of operation with the turbocharger in a supercharger mode.
Figure 3:
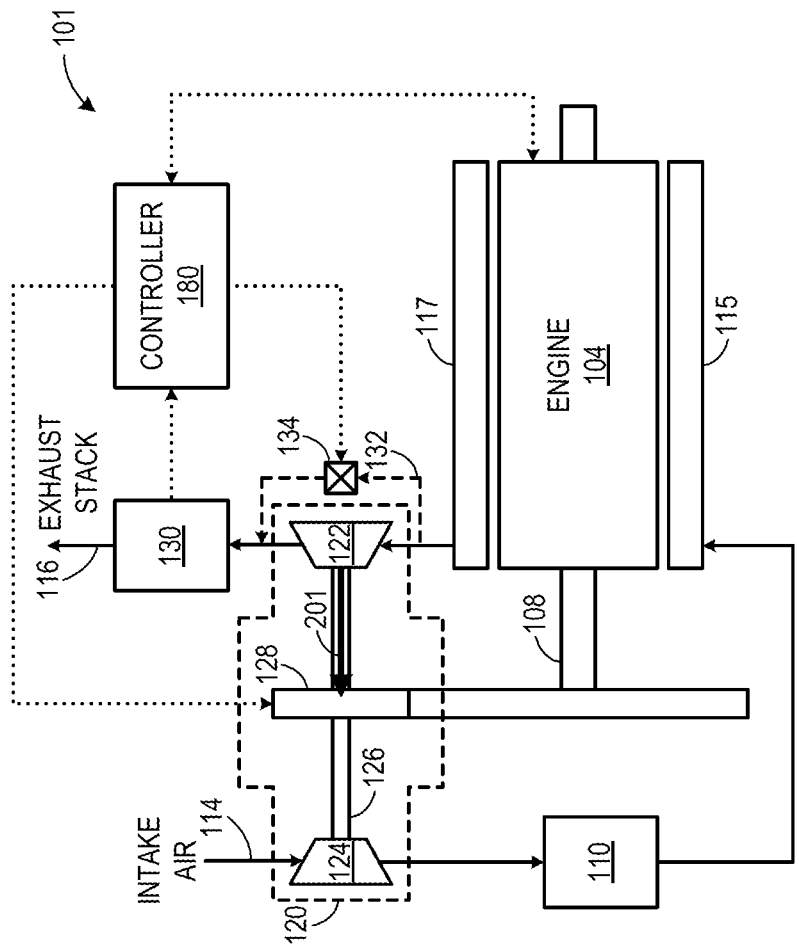
FIG. 3 shows a schematic diagram of the engine system of FIG. 1 in a non-regeneration mode of operation with the turbocharger in a turbocharger mode.
Figure 4:
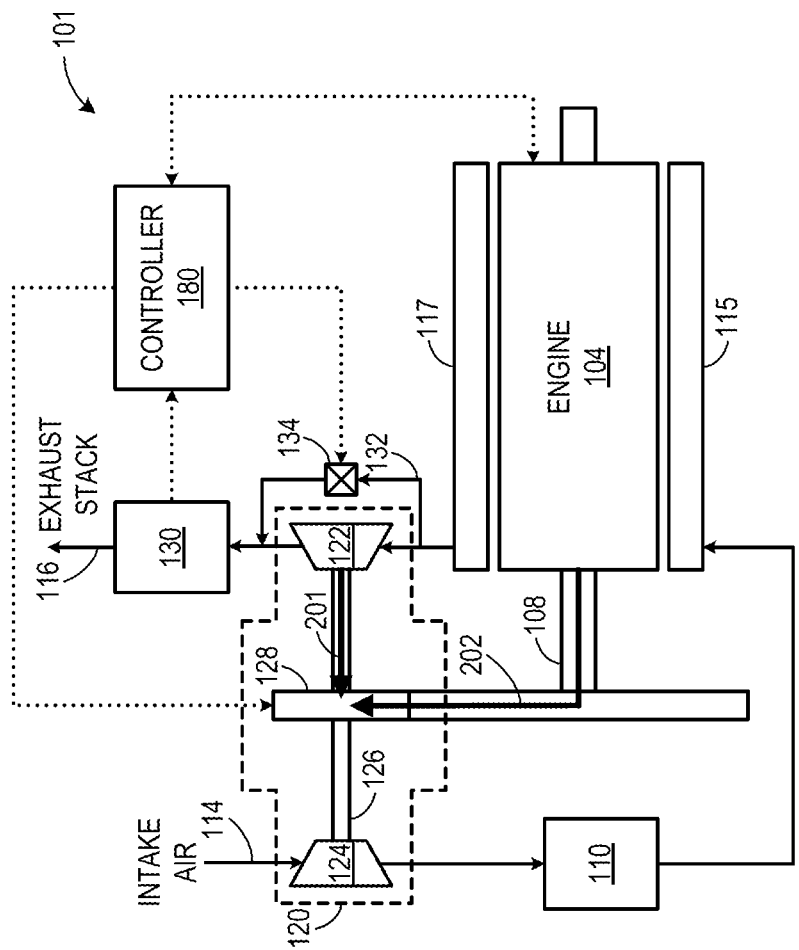
FIG. 4 shows a schematic diagram of the engine system of FIG. 1 in a regeneration mode of operation.

FIGS. 2-4 show the engine system 101 described above with reference to FIG. 1 in various modes of operation. In particular, FIGS. 2 and 3 show the engine system 101 in a non-regeneration mode of operation in which regeneration of an aftertreatment device may not occur. FIG. 4 shows the engine system 101 in a regeneration mode of operation in which regeneration of the aftertreatment device may occur.

As depicted in the example of FIG. 2, energy (indicated by arrows 201 and 202) is provided to spin the compressor 124 from exhaust gas and from mechanical output from the engine 104. In such an example, the engine 104 may be operating under a low engine load. As such, the exhaust gas may not supply enough energy to the turbine 122 to spin the compressor 124 at a desired speed. Thus, the clutch mechanism 128 may be engaged so that the crankshaft is mechanically coupled to the shaft 126 of the turbocharger 120, and the turbocharger is operated in the supercharger mode. As a non-limiting example, at relatively low engine loads, the exhaust gas may supply 50 percent of the energy 201 to the turbocharger 120 and mechanical output from the engine may supply 50 percent of the energy 202 to the turbocharger. As the engine load increases, the energy 201 supplied from the exhaust gas may increase.

Once the amount of energy 201 being supplied to the turbocharger 120 from the exhaust gas reaches a threshold amount, the clutch mechanism 128 may be disengaged, or released, from the crankshaft 108. As a non-limiting example, the threshold amount may be between 70 and 80 percent of the total energy supplied to the turbocharger 120. Once the clutch mechanism 128 is disengaged, the turbocharger enters the turbocharger mode, which is illustrated in FIG. 3. During operation in the turbocharger mode illustrated in FIG. 3, the engine may be operating under a relatively high engine load and substantially all of the energy supplied to the turbocharger 120 may be energy 201 from the exhaust gas.

During the non-regeneration mode of operation, in both the supercharger mode depicted in FIG. 2 and the turbocharger mode depicted in FIG. 3, the bypass control element 134 is closed such that substantially all of the exhaust gas is directed to flow through the turbine 122. By closing the bypass control element, the amount of energy extracted by the flow of exhaust gas through the turbine can be increased. In such a configuration, a temperature of the exhaust gas downstream of the turbocharger 120 is reduced due to the exhaust gas passing through the turbine 122 and driving the turbine 122. Because of the relatively low exhaust gas temperature downstream of the turbine 122, regeneration of a particulate filter included in the aftertreatment system 130 may not be carried out. In some examples, however, it may be possible for regeneration to be carried out. As one example, regeneration may be carried out if fuel is injected upstream of the particulate filter in order to increase the exhaust gas temperature. In such an example, however, fuel consumption may be increased, thereby reducing the efficiency of the system.

If regeneration is desired, the engine system 101 may enter a regeneration mode of operation, which is illustrated in FIG. 4. Regeneration may be desired when a particulate load of the particulate filter exceeds a threshold load, for example, as will be described in greater detail with reference to FIG. 5. During the regeneration mode of operation, the turbocharger bypass control element 134 is adjusted to an open position, such that at least some exhaust gas is routed to flow around the turbine 122, and not through the turbine 122. By opening the bypass control element, the amount of energy extracted by the flow of exhaust gas through the turbine can be decreased. In this way, high temperature exhaust gas may retain its relatively high temperature and the exhaust gas temperature downstream of the turbine 122 is increased such that regeneration of the particulate filter may occur. Because at least a portion of exhaust gas is bypassing the turbine 122, however, the exhaust gas energy 201 available to drive the turbocharger 120 is reduced. As such, the turbocharger is operated in the supercharger mode, and the clutch mechanism 128 is engaged such that mechanical output from the engine 104 drives the turbocharger 120.

As an example, during a low load mode of operation, the bypass control element may be adjusted (e.g., closed) to extract a first amount of work from exhaust flow through a turbine of a turbocharger, while driving the turbocharger via the exhaust gas and mechanical output from the engine. In comparison, during a high load mode of operation, the bypass control element may be adjusted (e.g., closed) to extract a second amount of work from exhaust flow through the turbine while driving the turbocharger via the exhaust gas. Herein, the second amount of work is larger than the first amount of work. Further, during a regeneration mode of operation, the bypass control element may be adjusted (e.g., opened) to extract a third amount of work from exhaust flow through the turbine while increasing an exhaust temperature downstream of the turbine and upstream of a particulate filter, and while driving the turbocharger via mechanical output from the engine. Herein, the third amount of work is smaller than each of the first and second amount of work.

Figure 5:
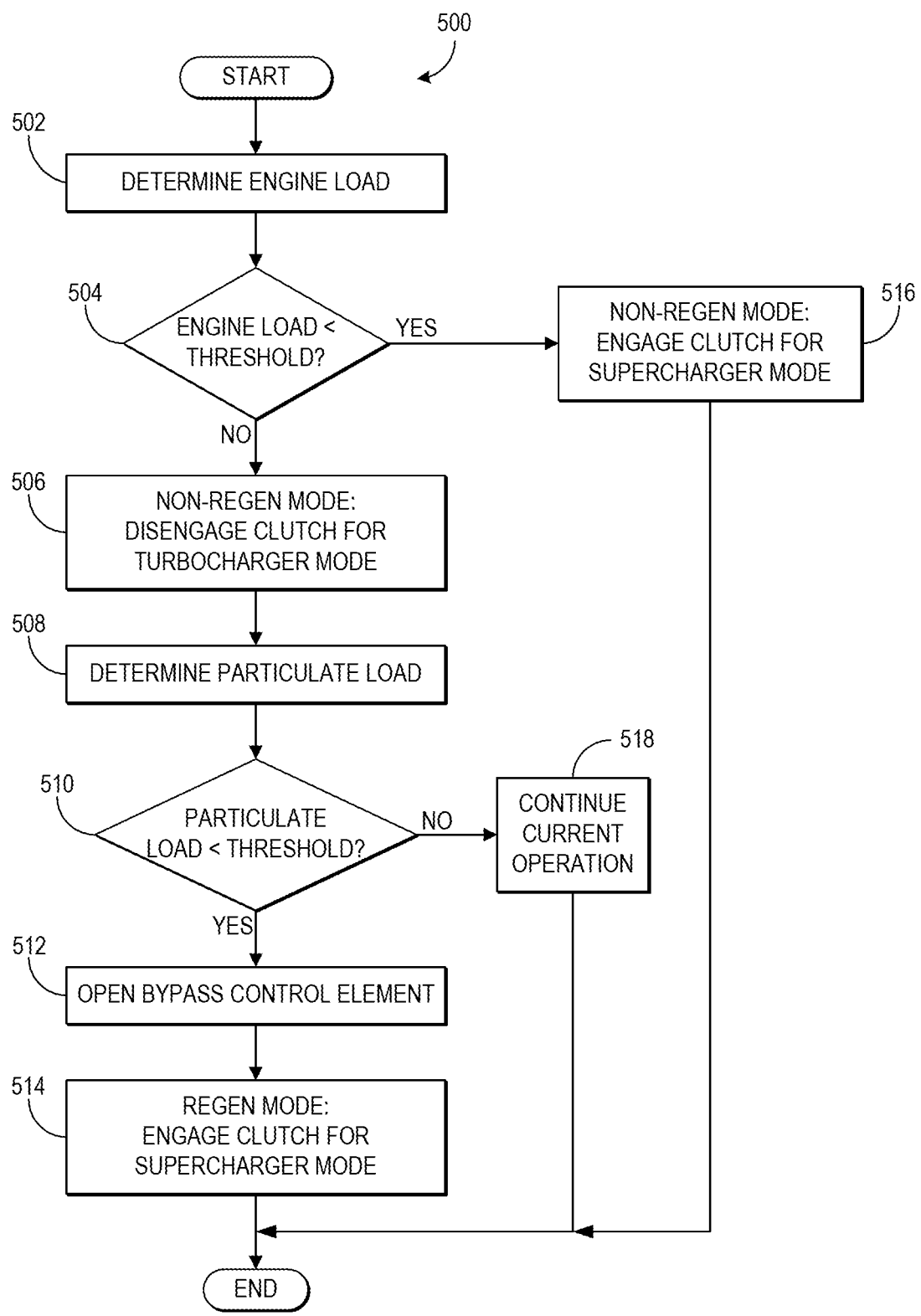
FIG. 5 shows a flow chart illustrating a method for operating the turbocharger of FIGS. 1-4.

Continuing to FIG. 5, a flow chart illustrating a method 500 for operating an engine system, such as the engine system 101 described above with reference to FIGS. 1-4, is shown. Specifically, the method determines the engine load and operates the turbocharger in turbocharger mode or supercharger mode based on the engine load. Further, the method determines a particulate load of a particulate filter and operates the engine system in a regeneration mode of operation based on the particulate load and the engine load.

At step 502, the engine load is determined. The engine load may be determined based on one or more of engine speed, airflow to the engine, ambient temperature, and the like.

Once the engine load is determined, it is determined if the engine load is greater than a threshold engine load at step 504. The threshold engine load may be based on an exhaust temperature or energy at an engine load. For example, as the engine load increases, the exhaust energy, or temperature, may increase. Thus, when the engine load is greater than the threshold load, the turbocharger may be operated in the turbocharger mode, as described above, without needing additional energy from the engine.

Thus, if it is determined that the engine load is less than the threshold load, the method moves to step 516 and the turbocharger is operated in the supercharger mode in the non-regeneration mode of the engine system. For example, the turbocharger is driven by both exhaust gas from the engine via the turbine and mechanical output from the engine via the crankshaft and clutch mechanism such that the output (e.g., boost) of the turbocharger is as desired.

On the other hand, if it is determined that the engine load is greater than the threshold load, the method proceeds to step 506 and the turbocharger is operated in the turbocharger mode in the non-regeneration mode of the engine system. For example, the engine load, and thus energy provided by the exhaust gas from the engine, is high enough to drive the turbocharger at the desired boost.

At step 508, the particulate load of the particulate filter is determined. As one example, the particulate load may be determined based on a pressure drop across the particulate filter. As another example, the particulate load may be determined from a soot model based on an amount of soot trapped and an amount of soot oxidized over time. As yet another example, the particulate load may be determined based on one or more soot sensors positioned upstream and/or downstream of the particulate filter.

Once the particulate load is determined, it is determined if the particulate load is greater than a threshold particulate load at step 510. The threshold particulate load may be a particulate load at which a backpressure in the exhaust passage upstream of the particulate filter begins increasing and/or when an efficiency of the system begins decreasing. If it is determined that the particulate load is less than the threshold particulate load, the method moves to step 518 and current operation is continued. For example, the engine continues to operate in the non-regeneration mode with the turbocharger operating in the turbocharger mode.

On the other hand, if it is determined that the particulate load is greater than the threshold load, the method continues to 512 and the bypass control element is adjusted to an open position such that exhaust gas is routed around the turbine of the turbocharger. In this manner, a temperature of the exhaust gas downstream of the turbine may be increased such that regeneration of the particulate filter may be carried out.

Once the bypass control element is opened, the turbocharger is operated in the supercharger mode in the regeneration mode of the engine system at step 514. As such, the clutch mechanism is engaged such that mechanical output from the engine may drive the turbocharger. In this way, the turbocharger may continue to provide the desired boost to the engine while the particulate filter is regenerated.

Figure 6:
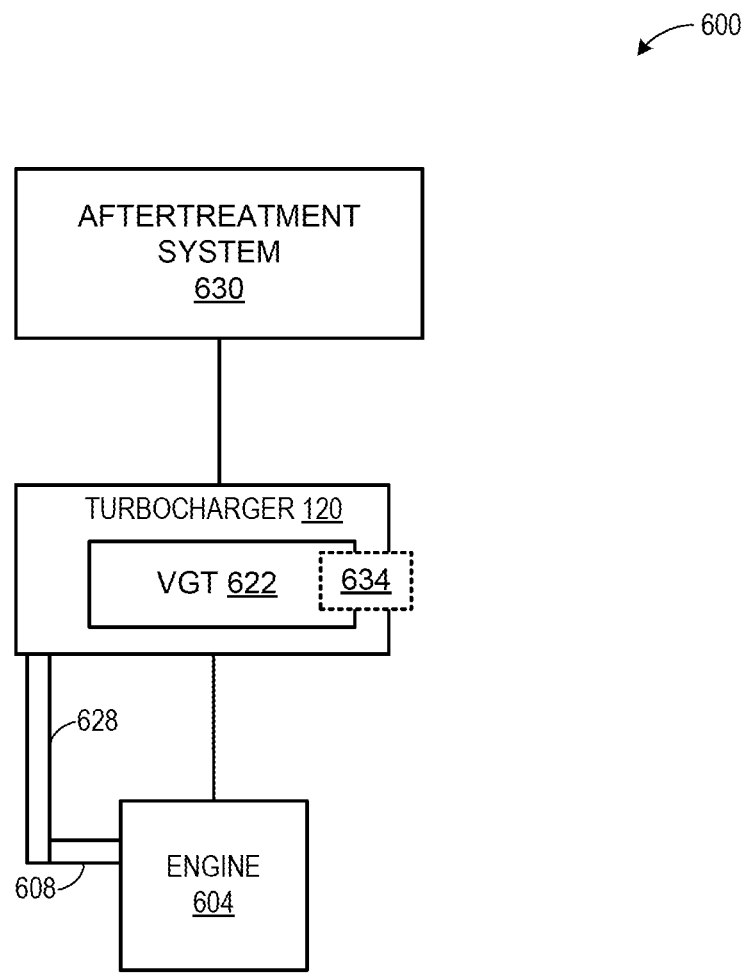
FIG. 6 shows a schematic diagram of an engine system including a turbocharger with a variable geometry turbine.

Another embodiment of a vehicle engine system is shown with reference to FIG. 6. Herein, the turbine of the engine's turbocharger is a variable geometry turbine and the amount of energy extracted from exhaust flow through the variable geometry turbine is adjusted by varying an aspect ratio of the turbine. At FIG. 6, engine system 600 includes engine 604 coupled to aftertreatment system 630 via turbocharger 620. Turbocharger 620 includes variable geometry turbine (VGT) 622 configured to be driven by exhaust flow received from the exhaust manifold of engine 604. Additionally, based on engine load conditions, turbine 622 may be driven by at least some energy from the engine 604 via clutch mechanism 628 which mechanically couples the turbocharger 620 to the crankshaft 608 of the engine 604. As described with reference to FIG. 1, the clutch mechanism 628 may be operated such that the turbocharger operates in two different modes: a turbocharger mode (wherein the clutch mechanism 628 is disengaged so that the crankshaft 608 is not mechanically coupled to the shaft of the turbocharger 620) and a supercharger mode (wherein the clutch mechanism is engaged so that the crankshaft 608 is mechanically coupled to the shaft of the turbocharger 620). Thus, turbocharger 620 can be driven via the exhaust gas from the engine 604 (by passing through the vanes of VGT 622) and by mechanical output from the engine 604 (in addition to exhaust gas from the engine). As such, in the supercharger mode, any exhaust gas which flows through the turbine 622 may continue to spin the turbine 622 and drive the turbocharger shaft.

VGT 622 may be communicatively coupled to bypass control element 634. By actuating bypass control element 634, an engine controller may change the geometry of turbine 622, thereby adjusting the aspect ratio of the turbine. Changing the geometry may include, for example, varying an angle of the vanes and/or changing a distance between the vanes. In still other embodiments, where the variable geometry turbine is a variable nozzle turbine, the bypass control element may be actuated to adjust a nozzle position or angle. As such, adjustments to the geometry of the VGT allow an amount of energy extracted from the exhaust flow through the turbine to be varied. As one example, the bypass control element may be actuated to decrease an amount of energy extracted from the exhaust flow through the turbine by increasing an aspect ratio (or area) of the variable geometry turbine. In this manner, more energy (e.g., higher temperature exhaust gas) may be available downstream of the turbine and upstream of the particulate filter such that regeneration of a particulate filter may be carried out. As another example, the bypass control element may be actuated to increase an amount of energy extracted from the exhaust flow through the turbine by decreasing an aspect ratio (or area) of the variable geometry turbine. In this manner, less energy (e.g., lower temperature exhaust gas) may be available downstream of the turbine and upstream of the particulate filter such that regeneration of a particulate filter may not be carried out. The various modes of operation of the engine system of FIG. 6 are elaborated with reference to FIG. 7.

Figure 7:
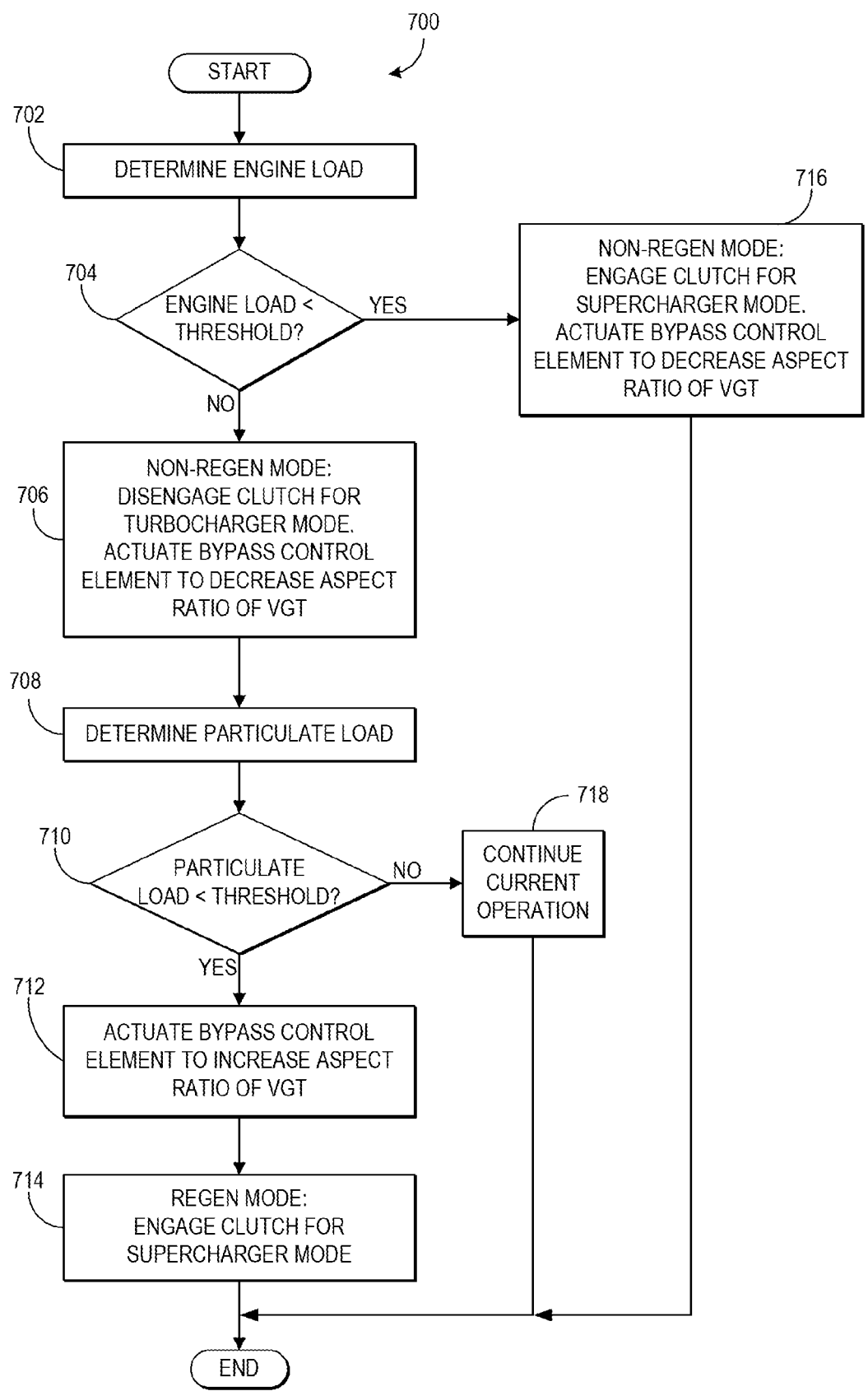
FIG. 7 shows a flow chart illustrating a method for operating the turbocharger of FIG. 6.

Now turning to FIG. 7, a flow chart illustrating a method 700 for operating an engine system, such as engine system 600 including a variable geometry turbine, described above with reference to FIG. 6, is shown. Specifically, the method determines the engine load and accordingly adjusts the turbocharger to operate in turbocharger mode or supercharger mode. Further, the method determines a particulate load of a particulate filter and operates the engine system in a regeneration mode of operation based on the particulate load and the engine load. Based on the selected mode, the bypass control element is actuated to vary an aspect ratio of the turbine and thereby change an amount of energy extracted from exhaust flow through the variable geometry turbine.

At step 702, the engine load is determined. The engine load may be determined based on one or more of engine speed, airflow to the engine, ambient temperature, and the like.

Once the engine load is determined, it is determined if the engine load is greater than a threshold engine load at step 704. The threshold engine load may be based on an exhaust temperature or energy at an engine load. For example, as the engine load increases, the exhaust energy, or temperature, may increase. Thus, when the engine load is greater than the threshold load, the turbocharger may be operated in the turbocharger mode, without needing additional energy from the engine.

If it is determined that the engine load is less than the threshold load, the method moves to step 716 and the turbocharger is operated in the supercharger mode in the non-regeneration mode of the engine system. Herein, a clutch mechanism may be engaged so that the crankshaft is mechanically coupled to the shaft of the turbocharger, and the turbocharger is operated in the supercharger mode. Consequently, the turbocharger is driven by both exhaust gas from the engine via the variable geometry turbine and mechanical output from the engine via the crankshaft and clutch mechanism such that the output (e.g., boost) of the turbocharger is as desired. As a non-limiting example, at relatively low engine loads, the exhaust gas may supply 50 percent of the energy to the turbocharger and mechanical output from the engine may supply 50 percent of the energy to the turbocharger. As the engine load increases, the energy supplied from the exhaust gas may be increased, until the threshold load is reached.

On the other hand, if it is determined that the engine load is greater than the threshold load, the method proceeds to step 706 and the turbocharger is operated in the turbocharger mode in the non-regeneration mode of the engine system. For example, the engine load, and thus energy provided by the exhaust gas from the engine, is high enough to drive the turbocharger at the desired boost.

It will be appreciated that in each of the turbocharger mode and supercharger mode of the non-regeneration mode of the engine system, the bypass control element 634 may be actuated to adjust the geometry of the VGT (e.g., decrease the aspect ratio) such that the amount of energy extracted from exhaust flow through VGT 622 is increased. In such a configuration, a temperature of the exhaust gas downstream of the turbocharger 620 and upstream of the particulate filter is reduced due to increased energy extraction by the turbine 622. Because of the relatively low exhaust gas temperature downstream of the turbine 622, regeneration of a particulate filter included in the aftertreatment system 630 may not be carried out.

At step 708, the particulate load of the particulate filter is determined. As one example, the particulate load may be determined based on a pressure drop across the particulate filter. As another example, the particulate load may be determined from a soot model based on an amount of soot trapped and an amount of soot oxidized over time. As yet another example, the particulate load may be determined based on one or more soot sensors positioned upstream and/or downstream of the particulate filter.

Once the particulate load is determined, it is determined if the particulate load is greater than a threshold particulate load at step 710. The threshold particulate load may be a particulate load at which a backpressure in the exhaust passage upstream of the particulate filter begins increasing and/or when an efficiency of the system begins decreasing. If it is determined that the particulate load is less than the threshold particulate load, the method moves to step 718 and current operation is continued. For example, the engine continues to operate in the non-regeneration mode with the turbocharger operating in the turbocharger mode.

On the other hand, if it is determined that the particulate load is greater than the threshold load, the method continues to 712 and the bypass control element is actuated to adjust the geometry of the VGT (e.g., increase the aspect ratio) such that the amount of energy extracted from exhaust flow through VGT 622 is decreased. In such a configuration, a temperature of the exhaust gas downstream of the turbocharger 120 is increased due to decreased energy extraction by the turbine 622. In this manner, a temperature of the exhaust gas downstream of the turbine may be increased such that regeneration of the particulate filter may be carried out.

Once the bypass control element is actuated, the turbocharger is operated in the supercharger mode in the regeneration mode of the engine system at step 714. As such, the clutch mechanism is engaged such that mechanical output from the engine may drive the turbocharger. In this way, the turbocharger may continue to provide the desired boost to the engine while the particulate filter is regenerated.

Thus, the engine system may be operated in a non-regeneration mode of operation and a regeneration mode of operation. In the non-regeneration mode of operation, the bypass control element may be adjusted (e.g., maintained in a substantially closed position such that most of the exhaust gas passes through the turbine to drive the turbine, or adjusted to decrease an aspect ratio of a VGT) so that an amount of energy extracted from exhaust flow through the turbine of the turbocharger is increased. Depending on the engine load, the turbocharger may be operated in the turbocharger mode in which the exhaust gas from the engine drives the turbocharger or the supercharger mode in which mechanical output from the engine provides supplemental power to drive the turbine. When the particulate load of the particulate filter exceeds a threshold particulate load, the engine system may be operated in the regeneration mode in which the bypass control element is readjusted (e.g., opened such that exhaust gas is routed around the turbine of the turbocharger, or adjusted to increase an aspect ratio of a VGT) so that an amount of energy extracted from exhaust flow through the turbine of the turbocharger is decreased. Because less energy is extracted by turbine and there is less energy to drive the turbine, the turbocharger is operated in the supercharger mode such that boost provided by the turbocharger to the engine may be maintained. In this manner, an operation of the engine system may be maintained, for example, during conditions such as particulate filter regeneration.

Another embodiment relates to an engine system for a vehicle. The system comprises a turbocharger including a turbine. The turbine is fluidly coupled with an exhaust passage of an engine. The system additionally comprises a bypass control element fluidly coupled with the exhaust passage upstream of the turbine. The bypass control element is controllable to an open state wherein exhaust gas in the exhaust passage is routed around the turbine to downstream of the turbine and a closed stated wherein the exhaust gas is not routed around the turbine. The system additionally comprises a selective mechanical coupling mechanism operably disposed between the turbocharger and a mechanical output of the engine. The selective mechanical coupling mechanism is controllable to a first state where the mechanical output of the engine is mechanically coupled to the turbocharger for driving the turbocharger and a second state where the mechanical output of the engine is not mechanically coupled to the turbocharger for driving the turbocharger. The engine system further comprises a control system. The control system is configured to control the bypass control element and the selective mechanical coupling mechanism in a first mode where less of the exhaust gas is routed through the turbine and the turbocharger is driven by the mechanical output of the engine and a second mode where more of the exhaust gas is routed through the turbine. ("Less" and "more" being relative to the first and second modes of operation.)

In another embodiment, the control system is configured to control the bypass control element and the selective mechanical coupling mechanism in the second mode such that the turbocharger is not driven by the mechanical output of the engine when an engine load is greater than a threshold engine load and the turbocharger is driven by the mechanical output of the engine when the engine load is less than the threshold engine load.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An engine system for a vehicle, comprising:
    a turbocharger including a turbine, the turbocharger configured to be driven via exhaust gas from an engine during a turbocharger mode and via the exhaust gas from the engine and mechanical output from the engine during a supercharger mode;
    a bypass control element communicatively coupled to the turbine of the turbocharger and operable to decrease an amount of energy extracted from an exhaust flow through the turbine in a particulate filter regeneration mode of operation and to increase an amount of energy extracted from the exhaust flow through the turbine during a particulate filter non-regeneration mode of operation; and
    an aftertreatment system disposed downstream of the turbocharger and including a particulate filter, wherein, in the non-regeneration mode, the turbocharger is operated in the turbocharger mode and the supercharger mode based on an engine load, and in the regeneration mode, the turbocharger is operated in the supercharger mode only.

2. An engine system for a vehicle, comprising:
    a turbocharger including a turbine, the turbocharger configured to be driven via exhaust gas from an engine during a turbocharger mode and via at least mechanical output from the engine during a supercharger mode;
    a bypass control element communicatively coupled to the turbine of the turbocharger and operable to decrease an amount of energy extracted from an exhaust flow through the turbine in a particulate filter regeneration mode of operation and to increase an amount of energy extracted from the exhaust flow through the turbine during a particulate filter non-regeneration mode of operation, where during the particulate filter regeneration mode of operation, regeneration of a particulate filter is occurring and during the particulate filter non-regeneration mode of operation, regeneration of the particulate filter is not occurring; and
    an aftertreatment system disposed downstream of the turbocharger and including the particulate filter, wherein, in the particulate filter regeneration mode, the turbocharger is operated in the supercharger mode only and soot is oxidized in the particulate filter, based on an engine load being less than a threshold engine load.

3. The engine system of claim 2, wherein the bypass control element is disposed in a bypass around the turbine, further comprising a control system operable to, during the non-regeneration mode of operation, close the bypass control element to increase the amount of energy extracted from the exhaust flow by routing exhaust gas through the turbine and drive the turbocharger via the exhaust gas based on an engine load, and, during the regeneration mode of operation, decrease the amount of energy extracted from the exhaust flow by opening the bypass control element to route exhaust gas around the turbine based on a particulate load of the particulate filter and drive the turbocharger at least partially via the mechanical output from the engine.

4. The engine system of claim 2, further comprising a clutch mechanism coupled between a crankshaft of the engine and a shaft of the turbocharger, wherein the clutch mechanism is engaged to drive the turbocharger via the mechanical output from the engine.

5. The engine system of claim 2, wherein the turbine of the turbocharger is a variable geometry turbine, and wherein an aspect ratio of the variable geometry turbine is adjusted by actuating the bypass control element.

6. The engine system of claim 5, further comprising a control system operable to, during the non-regeneration mode of operation, actuate the bypass control element to increase the amount of energy extracted from the exhaust flow by decreasing the aspect ratio of the variable geometry turbine, and, during the regeneration mode of operation, actuate the bypass control element to decrease the amount of energy extracted from the exhaust flow by increasing the aspect ratio of the variable geometry turbine.

7. The engine system of claim 2, wherein the vehicle is a rail vehicle.

8. A method, comprising:
during a particulate filter non-regeneration mode of operation, adjusting a bypass control element to increase an amount of energy extracted from an exhaust flow through a turbine of a turbocharger, and driving the turbocharger via at least one of the exhaust gas and mechanical output from an engine;
during a particulate filter regeneration mode of operation, adjusting the bypass control element to decrease an amount of energy extracted from the exhaust flow through the turbine, and driving the turbocharger via the mechanical output from the engine; and
during the non-regeneration mode of operation, operating the turbocharger in a turbocharger mode where the turbocharger is driven by the exhaust gas and a supercharger mode where the turbocharger is driven by the mechanical output from the engine, and during the regeneration mode of operation, operating the turbocharger in a supercharger mode where the turbocharger is driven by the mechanical output from the engine, where during the particulate filter regeneration mode of operation, regeneration of a particulate filter is occurring and soot is oxidized in the particulate filter and during the particulate filter non-regeneration mode of operation, regeneration of the particulate filter is not occurring;
wherein the particulate filter regeneration mode of operation and the particulate filter non-regeneration mode of operation are based on engine load.

9. The method of claim 8, further comprising, during the non-regeneration mode of operation, driving the turbocharger via the exhaust gas when an engine load is greater than a threshold engine load, and driving the turbocharger via the exhaust gas and the mechanical output from the engine when an engine load is less than the threshold engine load.

10. The method of claim 8, further comprising initiating the regeneration mode of operation responsive to a particulate load of the particulate filter positioned downstream of the turbine exceeding a threshold particulate load.

11. The method of claim 10, wherein the bypass control element is disposed in a bypass around the turbine, and wherein adjusting the bypass control element during the regeneration mode of operation to decrease an amount of energy extracted from the exhaust flow through the turbine includes opening the bypass control element to route exhaust gas through the bypass and around the turbine to a location upstream of the particulate filter, and wherein adjusting the bypass control element during the non-regeneration mode of operation to increase an amount of energy extracted from the exhaust flow through the turbine includes closing the bypass control element to route exhaust gas through the turbine.

12. The method of claim 11, further comprising initiating regeneration of the particulate filter during the regeneration mode of operation when an exhaust temperature downstream of the turbine and upstream of the particulate filter increases above a threshold exhaust temperature.

13. The method of claim 10, wherein the turbine is a variable geometry turbine, and wherein an aspect ratio of the variable geometry turbine is adjusted by actuating the bypass control element; and wherein adjusting the bypass control element during the regeneration mode of operation to decrease an amount of energy extracted from the exhaust flow through the turbine includes actuating the bypass control element to increase the aspect ratio of the variable geometry turbine, and wherein adjusting the bypass control element during the non-regeneration mode of operation to increase an amount of energy extracted from the exhaust flow through the turbine includes actuating the bypass control element to decrease the aspect ratio of the variable geometry turbine.

14. A method, comprising:
during a low engine load mode of operation of an engine, adjusting a bypass control element to extract a first amount of work from exhaust flow through a turbine of a turbocharger, and
driving the turbocharger via the exhaust flow and mechanical output from the engine;
during a high engine load mode of operation of the engine, adjusting the bypass control element to extract a second amount of work from the exhaust flow through the turbine, and
driving the turbocharger via the exhaust flow, the second amount of work larger than the first amount of work; and
during a particulate filter regeneration mode of operation, adjusting the bypass control element to extract a third amount of work from the exhaust flow through the turbine while increasing an exhaust temperature downstream of the turbine and upstream of a particulate filter, and
driving the turbocharger via mechanical output from the engine, the third amount of work smaller than each of the first amount of work and the second amount of work,
where during the particulate filter regeneration mode of operation, regeneration of a particulate filter is occurring, and soot is oxidized in the particulate filter, as a particulate load is less than a threshold particulate load.

15. The method of claim 14, wherein the low load mode of operation and the high load mode of operation comprise a particulate filter non-regeneration mode of operation where particulate filter regeneration is not occurring, the low load mode of operation including an engine load being less than a threshold engine load, and the high load mode of operation including the engine load being greater than the threshold engine load.

16. The method of claim 14, wherein the bypass control element is disposed in a bypass around the turbine, and wherein the bypass control element is closed during the non-regeneration mode of operation to route the exhaust flow through the turbine, and open during the regeneration mode of operation to route the exhaust flow around the turbine and through the bypass to a location upstream of the particulate filter.

17. The method of claim 14, wherein the turbine is a variable geometry turbine, wherein adjusting the bypass control element includes adjusting an aspect ratio of the variable geometry turbine, and wherein the bypass control element is adjusted to decrease the aspect ratio during the non-regeneration mode of operation, and the bypass control element is adjusted to increase the aspect ratio during the regeneration mode of operation.

18. The method of claim 14, further comprising engaging a clutch mechanism to mechanically couple the turbocharger to a crankshaft of the engine to drive the turbocharger via mechanical output from the engine.

19. The method of claim 14, further comprising initiating the regeneration mode of operation to regenerate the particulate filter when a particulate load of the particulate filter is greater than a threshold particulate load and an engine load is greater than a threshold load.

20. An engine system for a vehicle, comprising:
 a turbocharger including a turbine, wherein the turbine is fluidly coupled with an exhaust passage of an engine;
 a bypass control element fluidly coupled with the exhaust passage upstream of the turbine, wherein the bypass control element is controllable to an open state wherein exhaust gas in the exhaust passage is routed around the turbine to downstream of the turbine and a closed state wherein the exhaust gas is not routed around the turbine;
 a selective mechanical coupling mechanism operably disposed between the turbocharger and a mechanical output of the engine, wherein the selective mechanical coupling mechanism is controllable to a first state where the mechanical output of the engine is mechanically coupled to the turbocharger for driving the turbocharger and a second state where the mechanical output of the engine is not mechanically coupled to the turbocharger for driving the turbocharger; and
 a control system,
  wherein the control system sends one or more commands to control the bypass control element and the selective mechanical coupling mechanism in a first mode where less of the exhaust gas is routed through the turbine and the turbocharger is driven by the mechanical output of the engine and a second mode where more of the exhaust gas is routed through the turbine, and
  wherein the control system sends one or more commands to control the bypass control element and the selective mechanical coupling mechanism in the second mode such that the turbocharger is not driven by the mechanical output of the engine when an engine load is greater than a threshold engine load and the turbocharger is driven by the mechanical output of the engine when the engine load is less than the threshold engine load.

* * * * *